US009390539B2

(12) United States Patent
Akenine-Moller et al.

(10) Patent No.: US 9,390,539 B2
(45) Date of Patent: Jul. 12, 2016

(54) PERFORMING PARALLEL SHADING OPERATIONS

(75) Inventors: Tomas G. Akenine-Moller, Lund (SE); Rahul P. Sathe, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 12/611,970

(22) Filed: Nov. 4, 2009

(65) Prior Publication Data
US 2011/0102437 A1 May 5, 2011

(51) Int. Cl.
G06T 1/20 (2006.01)
G06T 15/00 (2011.01)
G06T 15/40 (2011.01)

(52) U.S. Cl.
CPC .............. G06T 15/005 (2013.01); G06T 1/20 (2013.01); G06T 15/40 (2013.01)

(58) Field of Classification Search
USPC .................................. 345/506, 422; 717/161
See application file for complete search history.

(56) References Cited

U.S. PATENT DOCUMENTS

| | | | | |
|---|---|---|---|---|
| 4,852,183 | A * | 7/1989 | Abe et al. ..................... | 382/218 |
| 5,357,600 | A * | 10/1994 | Shirman et al. ............... | 345/520 |
| 6,195,105 | B1 * | 2/2001 | Dilliplane et al. ............. | 345/506 |
| 7,202,867 | B1 * | 4/2007 | Rodriguez ............... | G06T 15/50 345/426 |
| 7,492,368 | B1 * | 2/2009 | Nordquist et al. ............ | 345/502 |
| 7,671,862 | B1 | 3/2010 | Patel et al. | |
| 8,169,439 | B2 * | 5/2012 | Luick et al. .................... | 345/502 |
| 8,179,394 | B1 * | 5/2012 | Everitt et al. ................. | 345/421 |
| 8,239,439 | B2 * | 8/2012 | Muff .................... | G06F 9/30036 708/490 |
| 2004/0010652 | A1 * | 1/2004 | Adams et al. ................. | 710/313 |
| 2005/0240644 | A1 * | 10/2005 | Van Berkel ......... | G06F 9/30025 708/441 |
| 2006/0010255 | A1 * | 1/2006 | Van Berkel ......... | G06F 9/30043 710/1 |
| 2006/0103659 | A1 * | 5/2006 | Karandikar ............... | G06F 3/14 345/558 |
| 2006/0107028 | A1 * | 5/2006 | Meuwissen ......... | G06F 9/30181 712/241 |
| 2007/0070080 | A1 * | 3/2007 | Graham et al. ............... | 345/589 |
| 2007/0182738 | A1 * | 8/2007 | Feldman et al. .............. | 345/427 |
| 2008/0001952 | A1 * | 1/2008 | Srinivasan et al. ............ | 345/502 |
| 2008/0001960 | A1 * | 1/2008 | Chen ............................ | 345/582 |
| 2008/0056382 | A1 * | 3/2008 | Hudson ................ | H04N 21/643 375/240.26 |
| 2009/0058852 | A1 * | 3/2009 | Strom et al. ................... | 345/422 |
| 2009/0153556 | A1 | 6/2009 | Nam et al. | |
| 2010/0107147 | A1 * | 4/2010 | Cha .............................. | 717/161 |

OTHER PUBLICATIONS

Great Britain Patent Office, British Office Action Report issued in corresponding GB Application No. GB1017205.4, dated Feb. 14, 2011, 12 pgs.
Jon Hasselgren et al., "Automatic Pre-Tessellation Culling", ACM Transactions on Graphics, vol. 28, No. 2, Article 19, Apr. 2009 (10 pages).

(Continued)

Primary Examiner — Phi Hoang
(74) Attorney, Agent, or Firm — Trop Pruner & Hu, P.C.

(57) ABSTRACT

A graphics processing pipeline may include at least two or more pipes, such that a lower frequency operation may be executed on one pipe while a higher frequency operation in the same instruction stream is executed at the same time on another pipe. In some cases, the lower frequency operation result may be held for later use in connection with the higher frequency operation on a different pipe. Especially where unused slots can be used for the lower frequency operation, efficiency may be improved.

11 Claims, 3 Drawing Sheets

(56) References Cited

OTHER PUBLICATIONS

Jon Hasselgren et al., "PCU: The Programmable Culling Unit", ACM Transactions on Graphics, vol. 26, No. 3, 2007 (10 pages).

U.S. Appl. No. 12/534,374, "Method, Apparatus, and Computer Program Product for Improved Graphics Performance", filed Aug. 3, 2009.

* cited by examiner

PERFORMING PARALLEL SHADING OPERATIONS

BACKGROUND

This relates generally to processor-based systems and, particularly, to processor-based systems that do graphics processing. In graphics processing, electronic data may be manipulated to present graphical images for display on computer displays.

Culling algorithms are used in computer graphics to avoid performing unnecessary work. For example, programmable culling eliminates the processing required for graphical elements that never actually appear in the final depiction. Graphical elements that are occluded by other elements never appear in the actual ultimate depiction, yet processing those elements may consume processing bandwidth and adversely affect performance. Objects that are not in the view frustum need not be processed. Similarly, features on surfaces that do not show in a graphical depiction do not need to be processed.

Culling shaders are generated automatically for multiple elements, such as pixels or vertices and are read once per group of primitives to decide whether to cull all of the elements of a group. For example, the decision may be made whether to cull multiple pixels at once. The culling tests are performed on groups of pixels called tiles and if a tile gets culled, then no pixel in that tile needs to be shaded or every pixel in that tile can execute a shorter and more efficient shader. To cull multiple points within a patch, the culling test is done for a conservative bound or multiple point enclosure.

Typical culling algorithms result in some overhead costs because they require extra processing. As a result, there is a performance hit from the culling algorithms, even though, net out, they result in a performance improvement, when culling actually eliminates tiles or groups of vertices.

DETAILED DESCRIPTION

Figure 1:
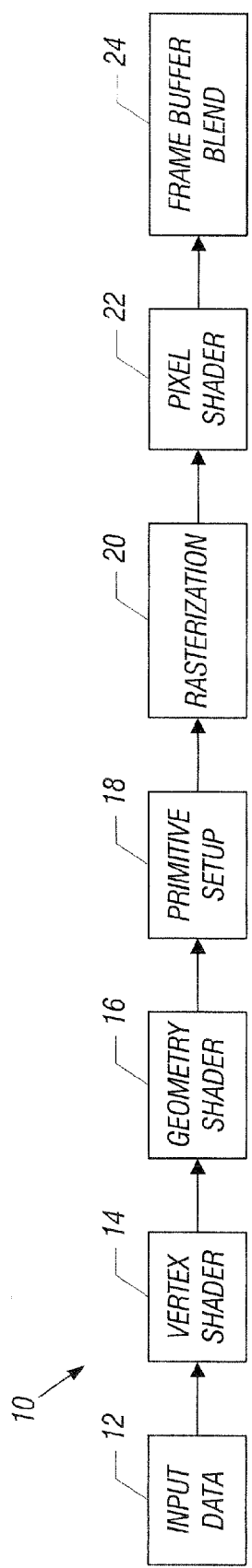
FIG. 1 is a schematic depiction of a programmable graphics pipeline in accordance with one embodiment of the present invention.

In some embodiments, a graphics processing core may include at least two or more pipes. In accordance with some embodiments, a lower frequency operation (that is one that occurs less often) may be executed on one pipe, while a higher frequency operation in the same instruction stream is executed at the same time on another pipe. In some cases, the lower frequency operation may be held for use at a later time in the higher frequency operation on the other pipe. Efficiency may be improved, in some cases, where it is possible to use unused slots in a lower frequency pipe to do operations that assist the operations going on in the higher frequency pipe.

Many examples of such parallelism are possible. For example, a lower frequency operation may be a culling shader, while the higher frequency operation may be a pixel shader. The lower frequency operation may be a fixed function culling operation, such as a view frustum or back face culling operation, while the higher frequency operation may be rasterization. As still another example, the lower frequency operation may be geometry shading, where the higher frequency operation is pixel shading. In general, any operation in the graphics pipeline may be run in parallel. As used herein, running in parallel means that the operations on at least two different pipes of a graphics pipeline are part of the same instruction stream and are done at the same time.

In some cases, the graphics pipeline may include one or more pipes, one of which is wider than the other. For example, in one embodiment, one pipe may be 16 lanes wide and another pipe may be 1 lane wide. Higher frequency operations may be done on a wider pipe and lower frequency operations may be done on a narrower pipe. However, there may be any number of pipes with a variety of widths. In the following discussion, an example is given where culling shading is done in a lower frequency pipe, while pixel shading is done in a higher frequency pipe. This is an extremely advantageous embodiment because it can enable culling shading with little or no overhead when the culling shading can be done at the same time as the pixel shading, using otherwise unused slots on the lower frequency pipe. However, the present invention is not so limited and is applicable to any number of pipes, any variety of pipe widths, and any of a variety of operations run in parallel at different frequencies.

In accordance with some embodiments, the actual vertex or pixel shader programs may be run in parallel. In a dual pipeline architecture, one pipeline, called the U pipeline or U-pipe, is responsible for primary instructions and a secondary, more restricted pipe, called the V pipeline or V-pipe, is responsible for scalar instructions. Scalar instructions operate on a single element at a time. The U-pipe operates on vector operations that handle multiple data items at a time.

In a typical graphics pipeline, programmable shader stages may be a dominant part of the workload. These shaders get compiled to a code that runs on the U-pipe, processing multiple elements at a time, due to the high throughput of the workload. Some scalar instructions are required to glue these vector instructions, but there are empty slots that do not get utilized. These empty slots can be utilized for executing a culling shader program for the next tile or draw call.

A "draw call" is a set of state and a group of geometry, such that the entire group and state may be sent to a graphics card via an application program interface using one (or at least very few) application program interface calls, saving overhead.

By using free or unused instruction slots in a parallel pipeline, there is not any performance degradation arising from the culling algorithm, because the culling program is executed in parallel on otherwise unused instruction slots on the parallel pipeline, such as the V-pipe. If there are not enough free instructions on the V-pipe, the shader loops can be "unrolled" to generate long segments of vector code until there are enough free slots.

Unrolling a loop may be explained as follows. If there is a loop for (i=0; i<4; i++){doSomething(i);}, a loop unroll would be doSomething(0); doSomething(1); doSomething(2); doSomething(3). A partial loop unroll is possible where you unroll some of the operations in the loop into a series of sequential constituent operations.

Referring to FIG. 1, a fully programmable pipeline 10 may receive input data 12, which is provided to a vertex shader 14, a geometry shader 16, and primitive set up 18. Rasterization 20 is followed by the pixel shader 22 and frame buffer blending 24.

Figure 2:
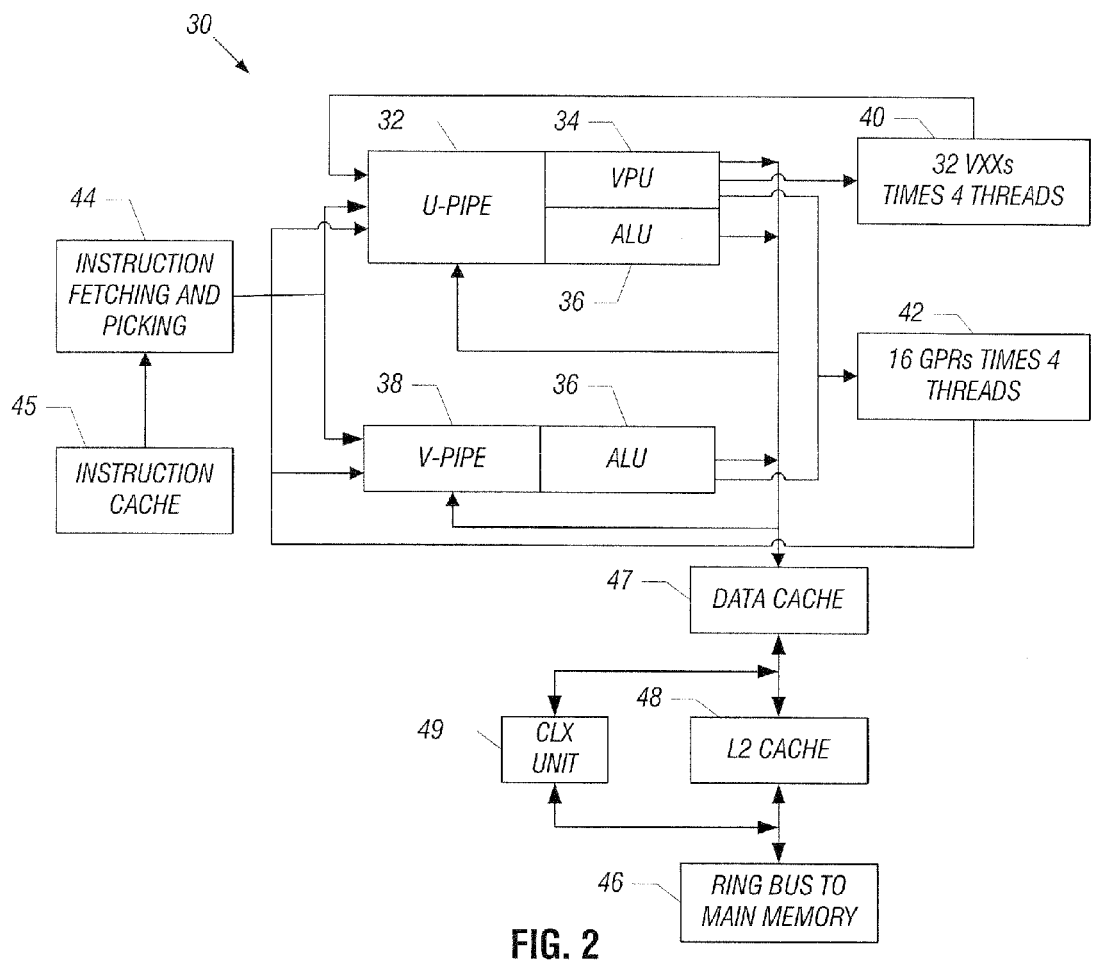
FIG. 2 is a depiction of a dual core processor architecture in accordance with one embodiment.

Referring to FIG. 2, the graphics processor core 30 may include a U-pipe 32 and a V-pipe 38. The U-pipe 32 is coupled to a vector processing unit 34 and an arithmetic logic unit 36. The vector processing unit 34 is coupled to 16 graphics processing registers times four threads 42 and 32 vector registers times four threads 40. The V-pipe 38 is coupled to an arithmetic logic unit 36 and the 32 vector registers 40 and 16 graphics processor registers 42.

The input to the U-pipe 32 and the V-pipe 38 comes from an instruction cache 45 that feeds an instruction fetching and picking unit 44.

A data cache 47 receives the output from various processing units 34 and 36 and provides data over a two way bus to a level two or L2 cache 48. The L2 cache 48 is coupled by a ring bus 46 to main memory. A clocking unit 49 provides clocking signals to the bus between the data cache and the L2 cache and the bus between the L2 cache and the ring bus.

The culling shader for a group of elements, such as a tile or a draw call, may be run before running shaders for those elements, because the point of the culling shader is to avoid running the shaders for objects that do not need to be shaded, such as occluded elements. To establish this ordering, the culling shader runs a culling test on the next group of elements to be shaded while the real shaders are processing the current group of elements. Thus, by the time the real shaders get to processing the next group on the U-pipe, the results for that shader's group cull test are available from the V-pipe.

The concept of interleaving scalar code works on higher level primitives as well with the vector code that works on lower level primitives to fully utilize the available hardware. For example, geometry shaders and pixel shaders can use parallel operations as well. The geometry shader works on triangles, which is a higher level primitive, while the pixel shader works on pixels, which is a lower level primitive. Conceptually, the geometry shaders can be interleaved based on the next triangle, while the pixel shader is working on the previous triangle's pixels.

In general, high frequency operations may be mapped at high throughput portions on the U-pipe and low frequency operations, that have low throughput, can be operated on the V-pipe. Interleaving code and mapping the frequency of operations to which the vector processing units can be generalized. If a machine has any given number of pipes, the code can be interleaved such that the least frequently executed code is mapped to the scalar code and the most frequently executed code is mapped to the widest vector unit.

Workloads can also be combined from the fixed function components of the pipeline, such as the interleaved fix function culling, such as the view frustrum, back face, etc. on the V-pipe with rasterization, which is a single instruction, multiple data (SIMD) instruction on the U-pipe. Interleaving the programmable shaders with culling shaders and fixed function single instruction, multiple data operations with fixed function culling operations enables each combination to use the same compilers within that combination. The code for all the fixed function compilers may be compiled using a conventional C++ compiler and the code for the shaders may be compiled with the shader language compilers. Because the compilers are the same, each compiler has full control of how best to interleave the scalar and vector code, in addition to other compiler optimizations that may be required to facilitate interleaving, such as loop unrolling.

In some embodiments, the culling algorithm may be extremely low cost because the culling shader may be executed in parallel with the vertex or pixel shading. To get enough free slots, the loop may need to be unrolled over the vertices in a draw call. Even though it may be difficult to gather enough tiles or draw calls to execute the culling shaders on the U-pipe, there may be a one-to-one relationship between the culling shaders and the pixel shaders, such that the culling shader is executed using scalars on a tile of pixels, while the pixel shader is executed on the U-pipe using vector instructions. This may simplify the rasterization and culling code in some embodiments.

Similarly, while the U-pipe loops over the vertices in a draw call and it evaluates the vertex shader for 16 vertices at a time, the U-pipe can compute the bounding box in free instruction slots on the V-pipe for the next draw call.

Figure 3:
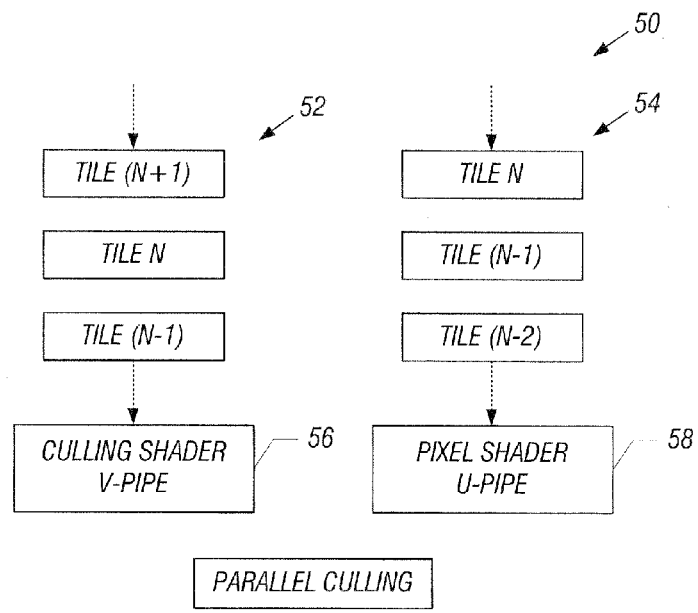
FIG. 3 is a flow chart for one embodiment of the present invention.

Thus, referring to FIG. 3, the parallel culling and shading sequence 50 has a first parallel path 52, which is a V-pipe path and the culling shader 56. The second parallel path 54 includes the pixel shader and U-pipe 58. The culling shader or V-pipe path handles the next tile n+1, a tile n, and a tile n−1, and so on. The U-pipe path is one tile behind, operating on tiles n, n−1, and n−2.

Thus, in one embodiment, the V-pipe is doing the culling using the scalar pipe while the U-pipe is actually doing the shading using vector instructions. Since the V-pipe operations are using otherwise unused slots, no performance hit is suffered, even when no culling is possible.

Figure 4:
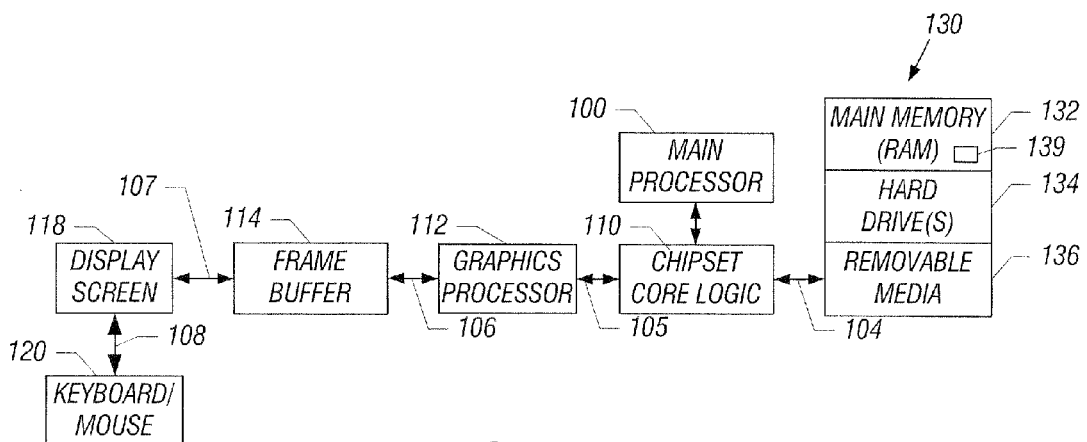
FIG. 4 is a system depiction for one embodiment.

The computer system 130, shown in FIG. 4, may include a hard drive 134 and a removable medium 136, coupled by a bus 124 to a chipset core logic 110. The core logic may couple to the graphics processor 112, via a bus 105, and the main or host processor 122 in one embodiment. The graphics processor 112 may also be coupled by a bus 126 to a frame buffer 114. The frame buffer 114 may be coupled by a bus 107 to a display screen 118, in turn coupled to conventional components by a bus 128, such as a keyboard or mouse 120.

In the case of a software implementation, the pertinent code may be stored in any suitable semiconductor, magnetic, or optical memory, including the main memory 132. Thus, in one embodiment, a code 139, to perform the sequence of FIG. 3, may be stored in a machine or computer readable medium, such as the memory 132, for execution by a processor, such as a processor 122 or the graphics processor 112. In one embodiment, the core 30 is part of the graphics processor 112.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   performing a vector operation on a first pipe of a graphics pipeline;
   performing a scalar operation on a second pipe of the graphics pipeline, said second pipe being in parallel with the first pipe, at the same time as said first operation, said vector and scalar operations being part of the same instruction stream, said vector operation passing through said first pipe, but not passing through said second pipe, and said scalar operation passing through said second pipe, but not passing through said first pipe; wherein said first pipe is wider than said second pipe and said vector operation occurs more frequently than said scalar operation.

2. The method of claim 1 wherein said vector operation is pixel shading and said second operation is culling shading.

3. The method of claim 1 including using empty slots on said second pipe to execute a culling shader program.

4. The method of claim 3 including finding slots by lengthening a segment on said second pipe until there are enough free slots to execute the culling shader program.

5. A non-transitory computer readable medium storing instructions for execution by a processor to:
 run in parallel two different frequency operations on a graphics pipeline, wherein one of the operations is to perform a vector operation on a first pipe in the graphics pipeline, and the other operation is to perform a scalar operation on a second pipe in the graphics pipeline, wherein said first pipe is wider than said second pipe and said vector operation occurs more frequently than said scalar operation, said first operating passing through said first pipe, but not passing through said second pipe, and said scalar operation passing through said second pipe, but not passing through said first pipe.

6. The medium of claim 5 further storing instructions to locate unused slots by unrolling a loop.

7. The medium of claim 5 further storing instructions to find slots by lengthening a segment on said second pipe until there are enough free slots to execute the culling shader program.

8. An apparatus comprising:
 a processor to perform a vector operation on a first graphics processing pipe and perform a scalar operation on a second graphics processing pipe, said vector and scalar operations being part of the same instruction stream, said vector operation passing through said first pipe, but not passing through said second pipe, and said scalar operation passing through said second pipe, but not passing through said first pipe, wherein said first pipe is wider than said second pipe and said vector operation occurs more frequently than said scalar operation; and
 a memory coupled to said processor.

9. The apparatus of claim 8, said shading to execute on a tile before said culling executes on said tile.

10. The apparatus of claim 8 wherein vector operation is pixel shading and said scalar operation is culling shading.

11. The apparatus of claim 8, said processor to find slots by lengthening a segment on said second pipe until there are enough free slots to execute the culling shader program.

\* \* \* \* \*